US007668928B2

(12) United States Patent
Newnam et al.

(10) Patent No.: US 7,668,928 B2
(45) Date of Patent: Feb. 23, 2010

(54) SYSTEM AND METHOD FOR RECORDING AND PLAYING BACK INTERACTIVE CONTENT DURING A BROADCAST EVENT

(75) Inventors: Scott G. Newnam, Cambridge, MA (US); Izet Fraanje, Cambridge, MA (US); Andrew J. Borleske, Charlestown, MA (US); Douglas T. Neumann, Somerville, MA (US)

(73) Assignee: Goldpocket Interactive Inc., Los Angeles, CA (US)

( * ) Notice: Subject to any disclaimer, the term of this patent is extended or adjusted under 35 U.S.C. 154(b) by 628 days.

(21) Appl. No.: 09/931,590

(22) Filed: Aug. 16, 2001

(65) Prior Publication Data

US 2002/0133827 A1 Sep. 19, 2002

Related U.S. Application Data

(63) Continuation-in-part of application No. 09/899,827, filed on Jul. 6, 2001, now abandoned, and a continuation-in-part of application No. 09/804,815, filed on Mar. 13, 2001.

(60) Provisional application No. 60/293,152, filed on May 23, 2001.

(51) Int. Cl.
*G06F 15/167* (2006.01)
*G06F 15/16* (2006.01)

(52) U.S. Cl. .................. 709/216; 709/217; 709/218; 709/219

(58) Field of Classification Search ................. 709/216, 709/217
See application file for complete search history.

(56) References Cited

U.S. PATENT DOCUMENTS

| 5,517,257 | A | * | 5/1996 | Dunn et al. ................. 348/734 |
| 5,537,141 | A | * | 7/1996 | Harper et al. ............... 725/116 |
| 5,539,822 | A | | 7/1996 | Lett |
| 5,581,803 | A | | 12/1996 | Grube et al. |
| 5,589,892 | A | | 12/1996 | Knee et al. ................... 348/731 |

(Continued)

FOREIGN PATENT DOCUMENTS

EP    1 187 485 A1    3/2002

(Continued)

OTHER PUBLICATIONS

ABC Sports, "ABC Sports To Launch Enhanced TV Programming During Jan. 4 Tostitos Fiesta Bowl College Football National Championship Game" *Press Release* (1998).

(Continued)

*Primary Examiner*—Ario Etienne
*Assistant Examiner*—Sahera Halim

(57) ABSTRACT

A system and method for interactive events relating to broadcast content, whether provided over the television, internet, or other means, provides messages that can be transmitted to different types of user devices, including personal computers, set top boxes, net top boxes, and wireless clients. The system can be used with personal recorders by recording interactive content for display with the broadcast when the recorder is used to play back the broadcast.

32 Claims, 9 Drawing Sheets

U.S. PATENT DOCUMENTS

| | | | |
|---|---|---|---|
| 5,638,113 A | 6/1997 | Lappington et al. | |
| 5,695,400 A | 12/1997 | Fennell, Jr. et al. | |
| 5,724,521 A | 3/1998 | Dedrick | |
| 5,734,413 A * | 3/1998 | Lappington et al. | 725/141 |
| 5,774,664 A | 6/1998 | Hidary et al. | 395/200.48 |
| 5,778,181 A | 7/1998 | Hidary et al. | 395/200.48 |
| 5,848,352 A * | 12/1998 | Dougherty et al. | 725/110 |
| 5,903,262 A | 5/1999 | Ichihashi et al. | |
| 5,930,765 A | 7/1999 | Martin | |
| 5,987,525 A | 11/1999 | Roberts et al. | |
| 6,006,256 A | 12/1999 | Zdepski | 709/217 |
| 6,007,426 A | 12/1999 | Kelly et al. | |
| 6,018,768 A | 1/2000 | Ullman et al. | 709/218 |
| 6,026,366 A | 2/2000 | Grube | |
| 6,061,719 A | 5/2000 | Bendinelli et al. | |
| 6,075,551 A | 6/2000 | Berezowski et al. | |
| 6,161,137 A | 12/2000 | Ogdon et al. | |
| 6,173,332 B1 | 1/2001 | Hickman | |
| 6,193,606 B1 | 2/2001 | Walker et al. | |
| 6,209,028 B1 * | 3/2001 | Walker et al. | 709/219 |
| 6,215,526 B1 | 4/2001 | Barton et al. | 348/473 |
| 6,233,389 B1 * | 5/2001 | Barton et al. | 386/46 |
| 6,239,793 B1 | 5/2001 | Barnert et al. | |
| 6,240,555 B1 | 5/2001 | Shoff et al. | |
| 6,263,505 B1 | 7/2001 | Walker et al. | |
| 6,331,144 B1 | 12/2001 | Walker et al. | |
| 6,414,635 B1 | 7/2002 | Stewart et al. | |
| 6,421,706 B1 | 7/2002 | McNeill et al. | |
| 6,426,778 B1 | 7/2002 | Valdez, Jr. | |
| 6,460,180 B1 | 10/2002 | Park et al. | |
| 6,526,335 B1 | 2/2003 | Treyz et al. | |
| 6,573,907 B1 | 6/2003 | Madrane | |
| 6,577,324 B1 | 6/2003 | Palmer et al. | |
| 6,637,032 B1 | 10/2003 | Feinleib | |
| 6,675,387 B1 | 1/2004 | Boucher et al. | |
| 6,684,257 B1 | 1/2004 | Camut et al. | |
| 6,699,127 B1 | 3/2004 | Lobb et al. | |
| 6,718,551 B1 * | 4/2004 | Swix et al. | 725/32 |
| 6,728,753 B1 | 4/2004 | Parasnis et al. | |
| 6,766,524 B1 * | 7/2004 | Matheny et al. | 725/23 |
| 6,799,327 B1 | 9/2004 | Reynolds et al. | |
| 7,024,677 B1 | 4/2006 | Snyder et al. | |
| 7,028,327 B1 * | 4/2006 | Dougherty et al. | 725/93 |
| 7,222,155 B1 | 5/2007 | Gebhardt et al. | |
| 2001/0001160 A1 * | 5/2001 | Shoff et al. | 725/51 |
| 2001/0032132 A1 | 10/2001 | Moran | |
| 2002/0023230 A1 * | 2/2002 | Bolnick et al. | 713/202 |
| 2002/0054244 A1 | 5/2002 | Holtz et al. | |
| 2002/0054750 A1 * | 5/2002 | Ficco et al. | 386/46 |
| 2002/0100039 A1 | 7/2002 | Iatropoulos et al. | |
| 2002/0103696 A1 | 8/2002 | Huang et al. | |
| 2002/0122060 A1 | 9/2002 | Markel | |
| 2002/0124249 A1 * | 9/2002 | Shintani et al. | 725/32 |
| 2002/0129381 A1 | 9/2002 | Barone, Jr. et al. | |
| 2002/0133562 A1 | 9/2002 | Newnam et al. | |
| 2002/0141734 A1 | 10/2002 | Murata et al. | |
| 2002/0143901 A1 | 10/2002 | Lupo et al. | |
| 2002/0162117 A1 | 10/2002 | Pearson et al. | |
| 2002/0184623 A1 | 12/2002 | Hodge et al. | |
| 2005/0015796 A1 | 1/2005 | Bruckner et al. | |
| 2007/0130581 A1 | 6/2007 | Del Sesto et al. | |

FOREIGN PATENT DOCUMENTS

| | | |
|---|---|---|
| WO | WO 97/34419 | 9/1997 |
| WO | WO 98/28916 | 7/1998 |
| WO | 00/78043 | 12/2000 |
| WO | WO 00/78043 A1 | 12/2000 |
| WO | WO 00/79365 | 12/2000 |
| WO | WO 01/39506 | 5/2001 |
| WO | WO 02/17642 | 2/2002 |

OTHER PUBLICATIONS

CNET News, "Companies Want To Raise Boob Tube's IQ" *Article* (1996).

Steeplechase Media, Inc., "Steeplechase Media Develops Enhanced TV The Documentary Channel" *Press Release* (1998).

Intel, "MTV and Intel Create New Interactive Experience For Music Fans" *Article* (1997).

Intel, "Intel and PBS To Air First Nationwide Enhanced Digital TV Broadcast" *Article* (1998).

Li Q, et al. "XML Based Text TV" *Proceedings of the International Conference on Web Information Systems Engineering* XP002192977 (2000), pp. 109-113.

Shim, et al. "Template Based Synchronized Multimedia Integration Language Authorizing Tool", *Proceedings of the SPIE*, Bellingham, VA., vol. 3964, (2000), pp. 134-142.

Hayashi et al. "TVML (TV Program Making Language)" Automatic TV Program Generation from Text-based Script. 1999, IEIC Technical Report, vol. 98, No. 552, 12 pages.

International Search Report, dated Jun. 2, 2004, for International Application No. PCT/US 03/10038, 6 sheets.

* cited by examiner

SYSTEM AND METHOD FOR RECORDING AND PLAYING BACK INTERACTIVE CONTENT DURING A BROADCAST EVENT

CROSS REFERENCE TO RELATED APPLICATION

This application claims priority from provisional patent application No. 60/293,152, filed Mar. 23, 2001, which is incorporated herein by reference, and is a continuation-in-part of application Ser. Nos. 09/804,815, pending, and 09/899,827, pending, each of which is incorporated herein by reference in its entirety for all purposes.

BACKGROUND OF THE INVENTION

In the interactive television market, early efforts for such interactivity have been centered simply on allowing devices such as PCs, set-tops, and net-tops to receive message types and display enhanced content. The industry lacks standard hardware and software and the products of several companies operate on separate systems Each of these systems is designed to act as a closed system: each cable headend, satellite broadcast system, etc. uses its own hardware and software within the system; digital set-top systems are designed to accept standardized triggers in the broadcast to retrieve additional information; the standardized triggering system can be an unreliable method of delivering interactivity as the triggers can be removed at any part of the line from broadcast through the MSO to the customer; the closed systems do not allow for full, real-time interactivity, but rather just send new information to the user upon request; and because all of the systems are closed, no system allows them all to be connected and provide real-time interactivity among all participants

SUMMARY OF THE INVENTION

A system of the present invention relates to connecting different client devices, such as PCs, set-top boxes, net-top devices, and wireless devices, using Internet Protocol (IP) to provide true interactivity, targeted advertising, and mechanisms for true convergence, preferably by leveraging the MPEG 4 standard set by the Motion Picture Experts Group (MPEG). A system of the present invention serves as a centralized system for connected all such external devices. Furthermore, such a system can connect closed systems, such as cable headends, and can allow different such systems to act as one cohesive system.

The system and methods of the present invention provide a comprehensive distribution and delivery system for interactive entertainment and for coordinating various types of interactive programming on various client devices (e.g., PC, set-top, net-top, consoles, or wireless) and to facilitate interaction with each other, and with on-line and/or on-air programming. This is preferably accomplished by using the advantages of IP to integrate such devices.

A system according to the present invention includes some or all of the following components: a server system that is capable of running multiple simultaneous interactive events; a software system including several independent components of an interactive program; an Interactive Program Guide (IPG) for assigning users to certain servers based on selected interactive programming; interactive content that populates the software components; an Electronic Programming Guide (EPG) that communicates the selected program to the IPG; a personal video recorder (PVR) that allows the user to time-shift television programming; a personal interactivity recorder (PIR) that records the interactive content and results associated with the recorded video signal; a controller that receives both industry standard triggers and also other message types and controls interactive content presentation in response to such triggers and message types; a content display interface that determines the layout of the interactive components based on the client hardware device and user preferences; and a client hardware device, such as a PC, set-top box, net-top box, console, or wireless device.

The system of the present invention (i) allows users to impact the programming in real-time; (ii) allows users to communicate with a producer of the programming; (iii) allows users to interact with each other across multiple platforms; (iv) is scalable to a television-sized audience; and (v) maintains synchronization among users. The system can provide all users with a similar interactive experience even though they might use one of several client hardware devices, and/or they might have different Internet connections speeds, they may or may not use an EPG, they might time-shift the programming using a PVR. The design of the system also creates opportunities for a new level of interactive and targeted advertising.

A television producer can utilize the system to provide related and synchronized interactive content for a television program. For either a live or taped broadcast, the producer can use the technical director to control content previously created and distributed to the client devices and to send dynamic content during the broadcast.

The interactive content is provided using Internet protocol (IP) and is therefore independent of the distribution of the television content. Accordingly, a producer of interactive content can also utilize the system to provided interactive content related to and synchronized with a television program without the cooperation of the television producer. If either the television producer or distributor is not participating in or cooperating with the interactive programming, message types sent over IP would determine the timing and content of the interactive programming.

If the television producer and the program distributor were cooperating in the production and distribution of the interactive content, they could utilize industry standard triggers (e.g., ATVEF triggers). ATVEF triggers are currently a standard set by the Advanced Television Enhancement Forum, in which URLs are embedded in the video signal during post-production to trigger interactivity. Cooperation between the television producer and the distributor is necessary for the use of some industry standard triggers because the distributor can remove them after post-production. The present invention can utilize these triggers, or an IP based messaging system, or a combination of both methods. The system of the present invention is flexible in terms of which types of triggers take precedent. The configuration of a specific event would determine the hierarchy of triggers. It can be configured to allow all types, take one over another or only allow for one type.

Existing set-top and net-top systems do not support the ability for the participant to affect the sequence and outcome of events in a program. With true interactivity according to the present invention, during a sports talk show, for example, the responses to polls and trivia questions can drive the commentary and direction of the show's host. Previous systems allowed users in a set-top or net-top world to merely play along with a show, without information being shared in real time with other participants or with the producer. An example might be playing along with a question-and-answer game show. In previous solutions, the television viewer would simply see a visual overlay on the screen allowing him or her to select the correct answer at the same time as the show. However, the participant's score is simply calculated on the set-top box for the participant's own knowledge. In fact, the participant has not in fact "interacted" with others. With the system of the present invention, information on every participant can be transmitted to a server system for real-time processing. Such processing allows for interactivity, such as display of aggregated results, bracketed tournaments for competition, fast display of competitor rankings, and voting for choices of a show's outcome.

The system and method of the present invention provides flexibility in interactive advertising by allowing (1) the display of advertisements that enhance the on-air advertisements without competing with them, (2) the ability to provide targeted or local advertisements, or (3) eliminating interactive advertisements to retain attention for the on-air ad. The system allows for a more targeted distribution of advertisements. For example, a broadcast might have three overlapping advertisements and the client hardware device displays one of the ads based on user preferences and experience. The system and method of the present invention allows for one of several enhanced advertisements to be delivered to the client hardware device based on similar preferences or according to the on-air ad being distributed.

Some targeted advertisement systems currently being deployed with television systems and set top boxes utilize profile and experience information stored on the set top box to select for display one of several ads being transmitted. The present invention allows users to answer questions, participate in polls, request information, obtain coupons, locate stores, etc. by interacting directly with the server system. Key information is stored or processed at the server system and can be used to more effectively target advertisement delivery. This results in lower bandwidth consumption and allows for a larger potential number of targeted ads or information to be distributed since every user does not have to receive every piece of content.

Many consumers currently use electronic program guides (EPGs) to inform them of available and scheduled programming and to bring them to the selected television program. If an EPG is resident on a client hardware device, the system of the present invention allows the EPG to interact with the Interactive Program Guide (IPG) of the present invention to communicate the selected program and assign the user to the appropriate Interactive Program Cluster of the server system.

The system of the present invention addresses problems with interactive programming in combination with time-shifting devices, such as personal video recorders (PVRs), which are individual storage devices used with the television (e.g., TiVo recorders from Tivo, Inc.). Any device that has network and video receiving/recording capabilities can be considered a time-shifting device; e.g., a PC can have video receiving capability and can store broadcast programming and other content.

In one embodiment, a PIR (personal interactivity recorder) engine collects links to interactive content associated with a particular video frame and/or interactive content itself and records that interactive content. When the broadcast is replayed, the content from each link or the content itself is displayed as the show progresses. Playback works the same as in the previously described interactive mechanism except the content does not need to be accessible from a server after the event, and the client device does not even have to be connected to the network. This eliminates the need for extra network storage costs, and lowers bandwidth requirements. Alternatively, the user could be connected to the network during playback. The playback feature with interactive content provides a potentially more enjoyable experience for the participant because, similar to live participation in the interactive program, the participant can compare his or her responses to the rest of the audience.

Another advantage of the system and method of the present invention is provided by the content display interface. The content display interface determines the size, shape, and location of the various components of interactivity based on the user's client hardware device and preferences. In one example, a user participating in interactive programming using a PC and separate television would see the entire PC monitor occupied by interactive components while a user on a net-top device might see components arranged on the left and bottom of the video screen while the television program occupies the remainder of the screen. In another example, a participant in a multi-player game not associated with a television broadcast would use the entire screen even though the participant is using a set-top, net-top or console as his client hardware device. Another participant might select only to receive programming information as a ticker along the bottom of the screen. In yet another example, two users sharing the same display might choose to each have a component for polls and contests while sharing a chat box and fun fact display. The content display interface allows users to select from available options, which may be limited based on the type of client hardware device and program.

The system of the present invention allows for a single interactive system to provide interactivity to and among users of various client hardware devices including digital head-end set-top boxes, net-tops, wireless devices, consoles, PCs and digital televisions. The present system connects to each client device using Internet Protocol. Because each client device and sub-system (e.g., Scientific Atlanta based head-end or Sprint based wireless) is slightly different, the system connects at different points in these devices, but maintains a constant communication via Internet Protocol through all systems. The system uses a software component referred to as an event management engine (EM Engine) to receive ATVEF triggers and other message types over IP and use them to control the interactive program.

Other features and advantages will become apparent from the following detailed description, drawings, and claims.

DETAILED DESCRIPTION

A content provider, such as a television network, can broadcast television programming to a television via cable, satellite, over-the-air, or other means. The program that is broadcast is a type of event, and the episodes are instances of that event. Events can consist of an on-air and on-line programming.

The system of the present invention provides a novel way of coordination and synchronization of interactivity across multiple client devices based on Internet Protocol (IP). The client devices can be a range of different devices, the most-used current examples of which are a computer client (further referred to as PC client but can also run on different platforms such as Macintosh), set-top client, net-top client (e.g., WebTV, a return path over dial-up), consoles, and wireless clients. The server system is responsible for interactive processing for activities, such as games, polls, and fun facts. The server system can communicate with the client devices to initiate display of content through different types of messages (over IP). The client device will leverage a message library to interpret the messages.

The on-line programming can be synchronized to the on-air broadcast by the server system's messaging system.

The server system preferably has an interactive program cluster for each concurrent interactive event. Each interactive program cluster can include an administrative server, multiple event servers, ad servers, multiple chat servers, multiple streaming servers, and a technical director. One or more of these components can be combined on a single computer or allocated among separate computers.

Figure 1:
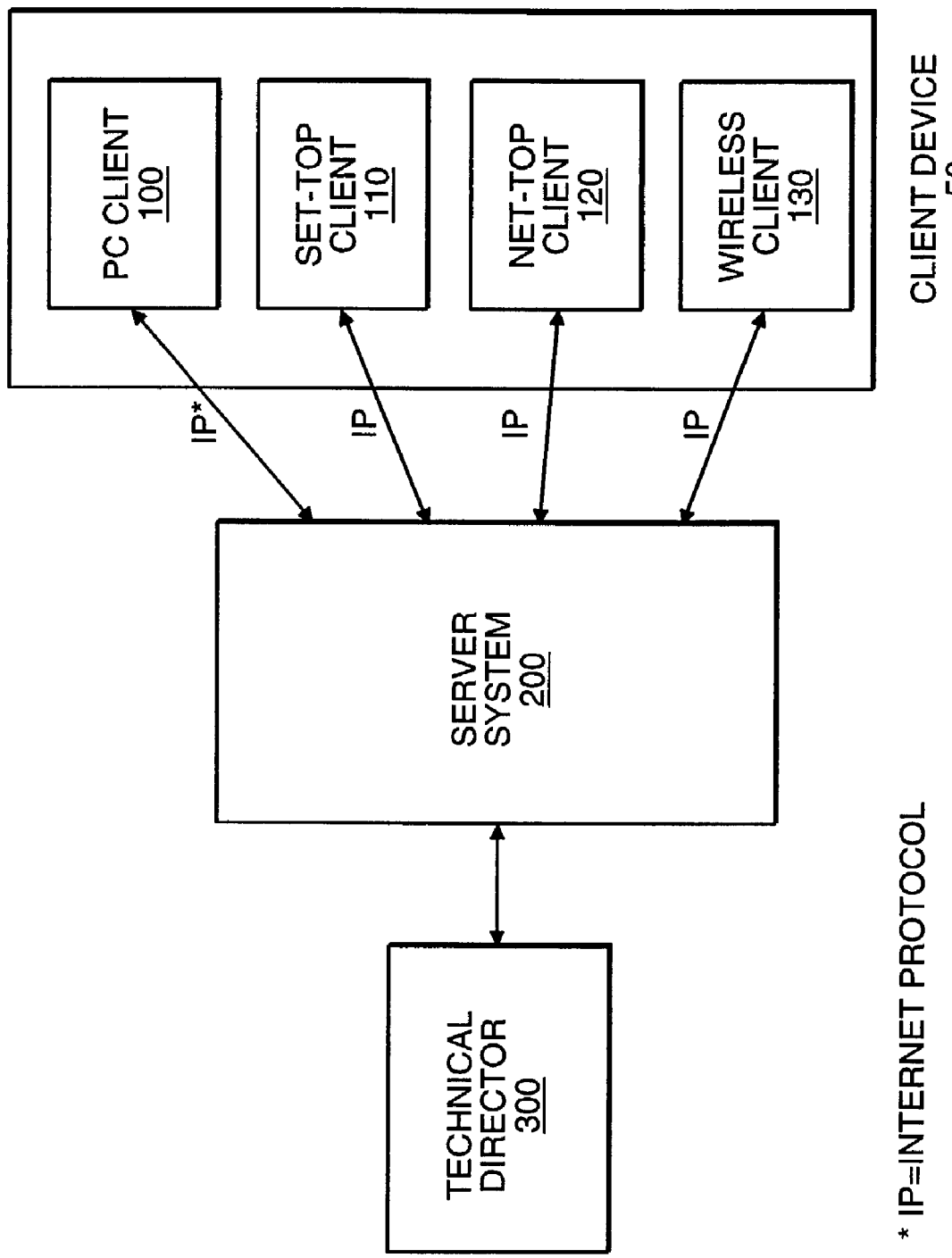
FIG. 1 is a block diagram of the server system that coordinates interactivity across multiple client devices over Internet Protocol.

FIG. 1 shows the components of an embodiment of the present invention for the coordination of interactivity and 'on-line' programming across multiple client devices. The server system 200 sends messages across Internet Protocol to control the interactivity on the client devices: PC client 100, set-top client 110, net-top client 120 and wireless client 130. This is an illustrative selection of client devices that can interact with server system 200. Examples of other client devices are consoles and handheld devices. The messages are interpreted on the client devices using a message library. In one embodiment, the server system 200 detects the type of client device. Based on the type of client device, a device-specific configuration file can be provided to the client device that supports the interpretation of messages sent by server system 200. In another embodiment, the client device software interprets messages and tailors messages to the specific device.

The communication from these client devices back to the server system 200 is also preferably provided over IP. The system thus allows multiple client devices 50 (and different types of client devices) to simultaneously interact with server system 200. In general, the communication is initiated by the server system 200 after a user has indicated a preference to participate in interactive programming. To provide true interactivity the server system 200 can initiate this communication and keep this connection open during the full duration of an interactive program.

The technical director 300 is a software interface on a computer and is the interface between a producer of the event, such as a television broadcaster, and the system. The technical director 300 allows viewers to impact the content of the event in real-time by enabling the producer to change the content based on input received from viewers. The technical director 300 can also, for example, receive, display, and allow the producer to select questions posed to the producer or event's host or comments made by the user. The producer can respond to the questions or comments through the real-time creation of event content. The new content could be multi-media content distributed by a broadcaster or content created by the technical director 300. For example, the technical director 300 allows producers to generate real-time content (e.g., a real-time fun fact or poll) and to initiate the display of such content.

Figure 2:
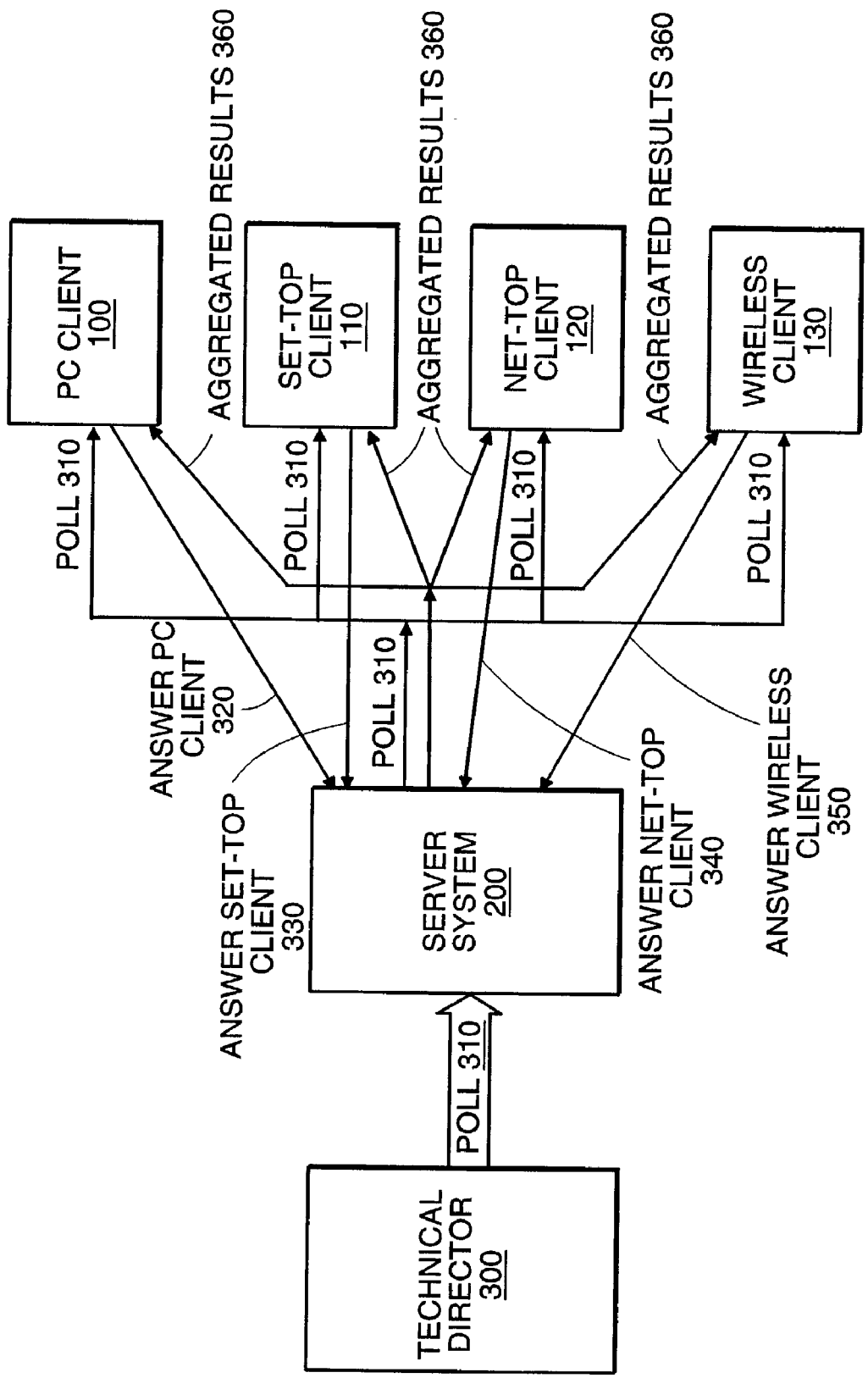
FIG. 2 shows an example (poll) of the coordination and aggregation of interactivity by the server system across multiple client devices.

FIG. 2. shows an example of interactivity (namely, a poll) across multiple client devices by server system 200. A producer can initiate a poll using the Technical Director 300. The server system 200 receives poll 310 and sends poll 310 to the different client devices: PC client 100, set-top client 110, net-top client 120 and wireless client 130. The users of these client devices send back their responses: answer PC client 320, answer set-top client 330, answer net-top client 340, and answer wireless client 350. The server system 200 processes all these results and sends back out the aggregated results 360 to each of the different client devices.

Other types of interactivity can include fun facts (which do not require a response), and trivia questions, whereby the aggregated results can include answers, scores, and a leader board of high scores. The system can also provide chat functionality among users, and can allow textual messages to be sent to and from a producer. In response to chat or other textual messages, the producer can tailor or generate content provided during the broadcast. These functionalities can each be provided by a separate server, or multiple functionalities can be combined in one or more servers.

Content can be provided in advance of the start of the broadcast, during the broadcast for storage during the broadcast, or in real time from the server. In the first two cases, a message is sent from the server to cause the previously provided content to be displayed. The approach of providing the content before display is particularly useful for graphics and other items of content with higher bandwidth. In the third case, the content is provided in real time, preferably with a message type that causes that message to be processed. The content can thus be interpreted in real time or from storage. The types of content and the methods of transmission are also described in the incorporated pending applications.

Figure 3:
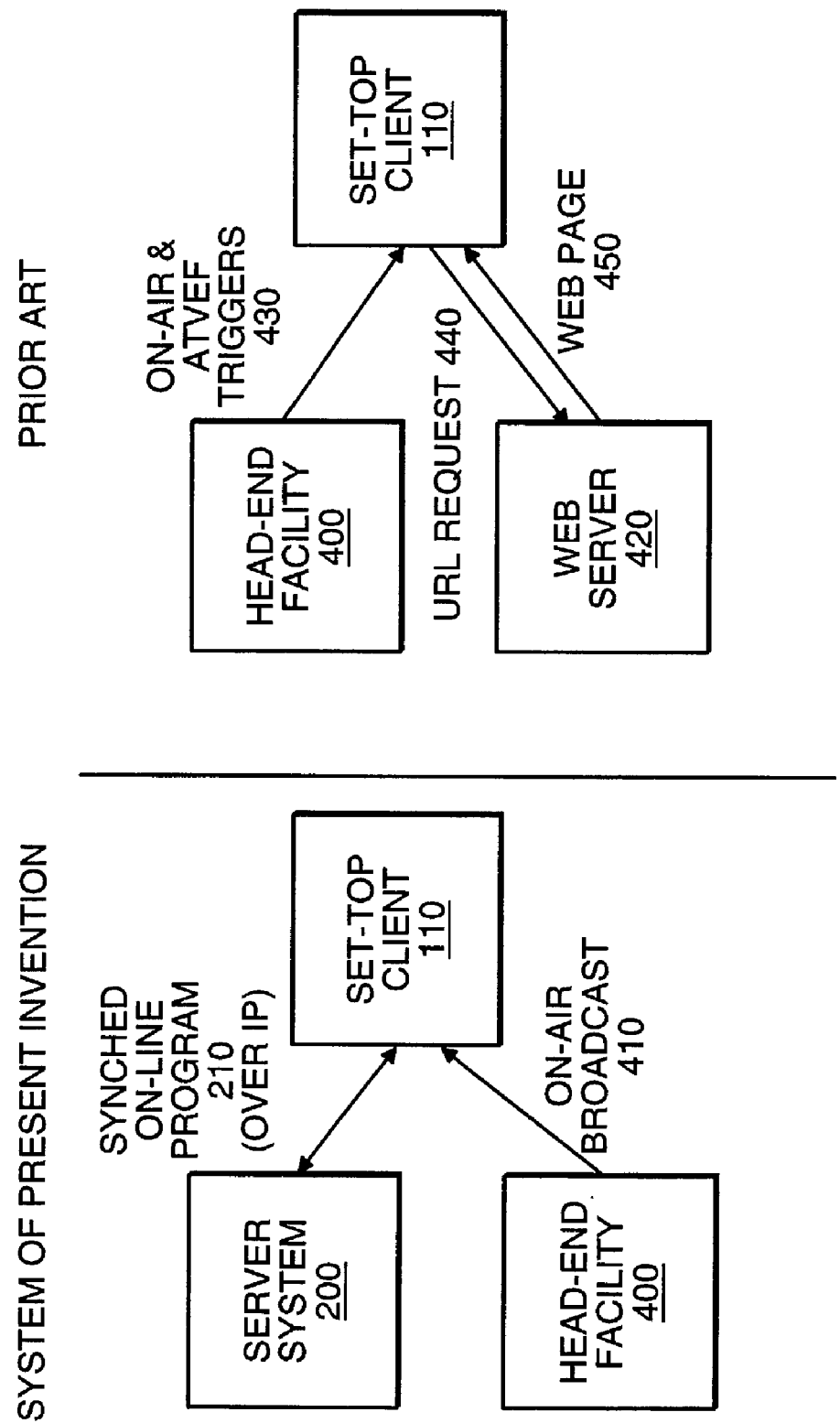
FIG. 3 shows the comparison of the system of the present invention for synchronization to broadcast over IP and the prior art embedded ATVEF triggers.

In FIG. 3, and embodiment of the present invention is compared to a prior art system. In a prior art system, a head-end facility 400 sends an on-air broadcast signal with embedded ATVEF triggers 430 to the set-top client 110. The ATVEF trigger specifies a URL. The set-top client 110 sends a URL request 440 to the web Server 420. The web server 420 serves up a web page 450 to the set-top client 110.

The system of the present invention decouples the distribution and production of on-line enhanced TV programming from the production and distribution of the on-air broadcast. The server system 200 provides the mechanism of synched on-line program 210 over IP without embedding ATVEF triggers in the on-air broadcast signal. The on-air broadcast signal 410 is delivered by the head-end facility 400 to the set-top client 110. In the system of the present invention the ATVEF triggers do not have to be embedded in the on-air broadcast 410. This ability to avoid embedded triggers allows producers other than the on-air broadcast producers to create on-line programming. Furthermore, the system of the present invention can prevent MSOs (the operators of the head-end facility 400) from restricting the availability of interactive programming by removing ATVEF triggers from the signal 430 provided to the set-top client 110.

Figure 4:
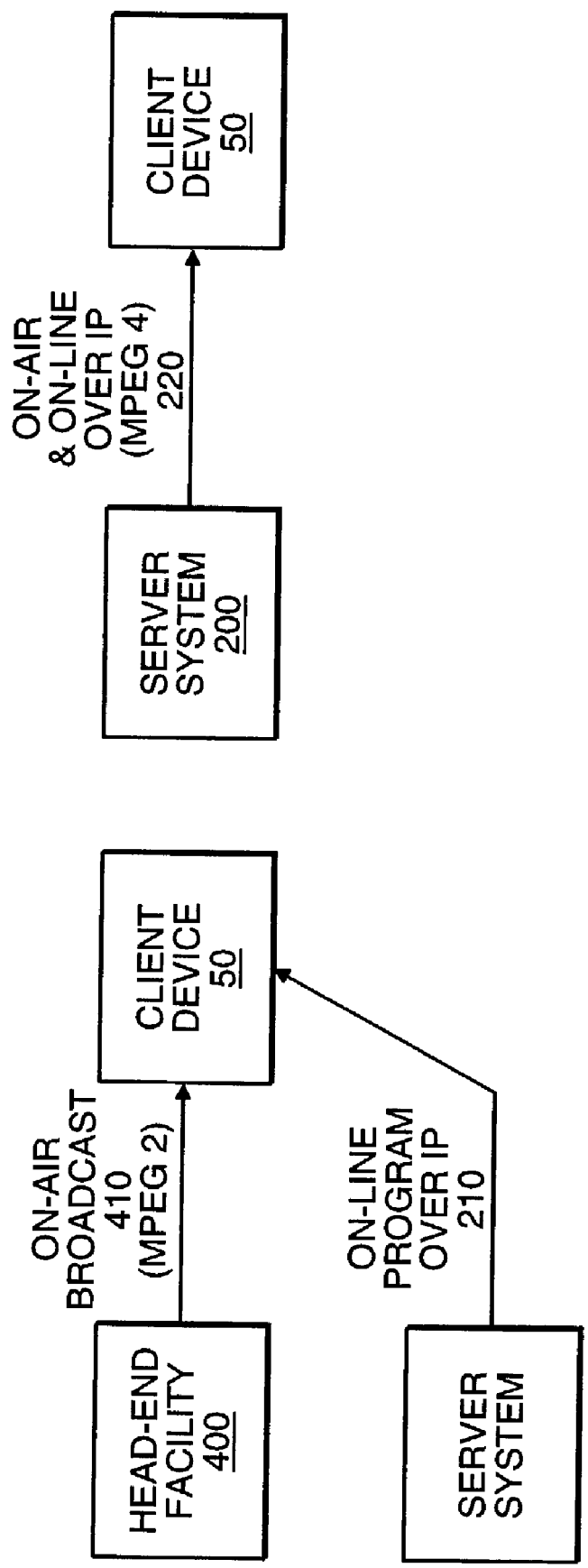
FIG. 4 shows an example of the convergence of on-line and on-air programming into a combined MPEG4 stream over Internet Protocol.

FIG. 4 illustrates the convergence of the on-line program over IP 210 with the on-air broadcast 410 in on-air and on-line programming 220 over IP. In one embodiment, the head end facility 400 provides the on-air broadcast 410 (e.g., based on MPEG2) to the client device 50. The server system 200 provides the on-line program over IP 210 to the client device 50 using the built-in synced-to-broadcast mechanism as described above. In another embodiment the server system 200 takes over the functionality of the head end facility 400 by combining on-air and on-line programming over IP 220 into one signal. One of the standards for this convergence over IP is MPEG4.

Figure 5:
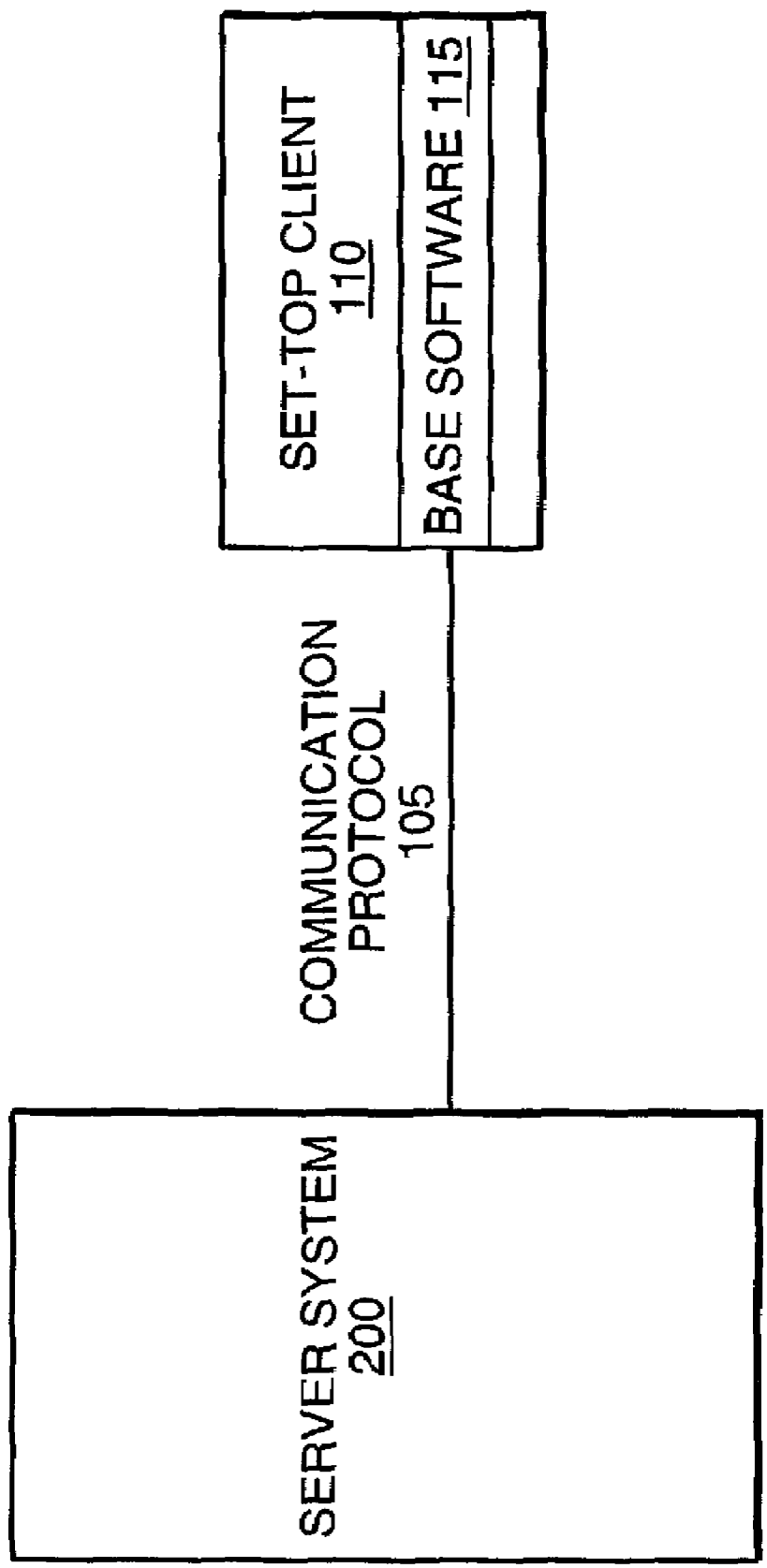
FIG. 5 illustrates the thin communication protocol between the server system and set-top client that provides true interactivity.

FIG. 5 shows the lightweight communication protocol 105 that allows for true interactivity for client devices that do not have this true interactivity today. The base software 115 on the set-top client 110 knows how to interpret the messages from server system 200 and provides light and fast communication with the server system through which the user of set-top client 110 can actually participate in interactive features such as real-time polls and trivia. The server system 200 initiates and maintains the connection with the base software 115 that is part of the set-top client 110 using the communication protocol 105 (based on IP). The base software can be part of the operating system of a user device, or it can be incorporated in other software, such as in a browser, or it can be a provided later like an application program, such as by being downloaded over the Internet or by flashing it to the memory of a client device.

Figure 6:
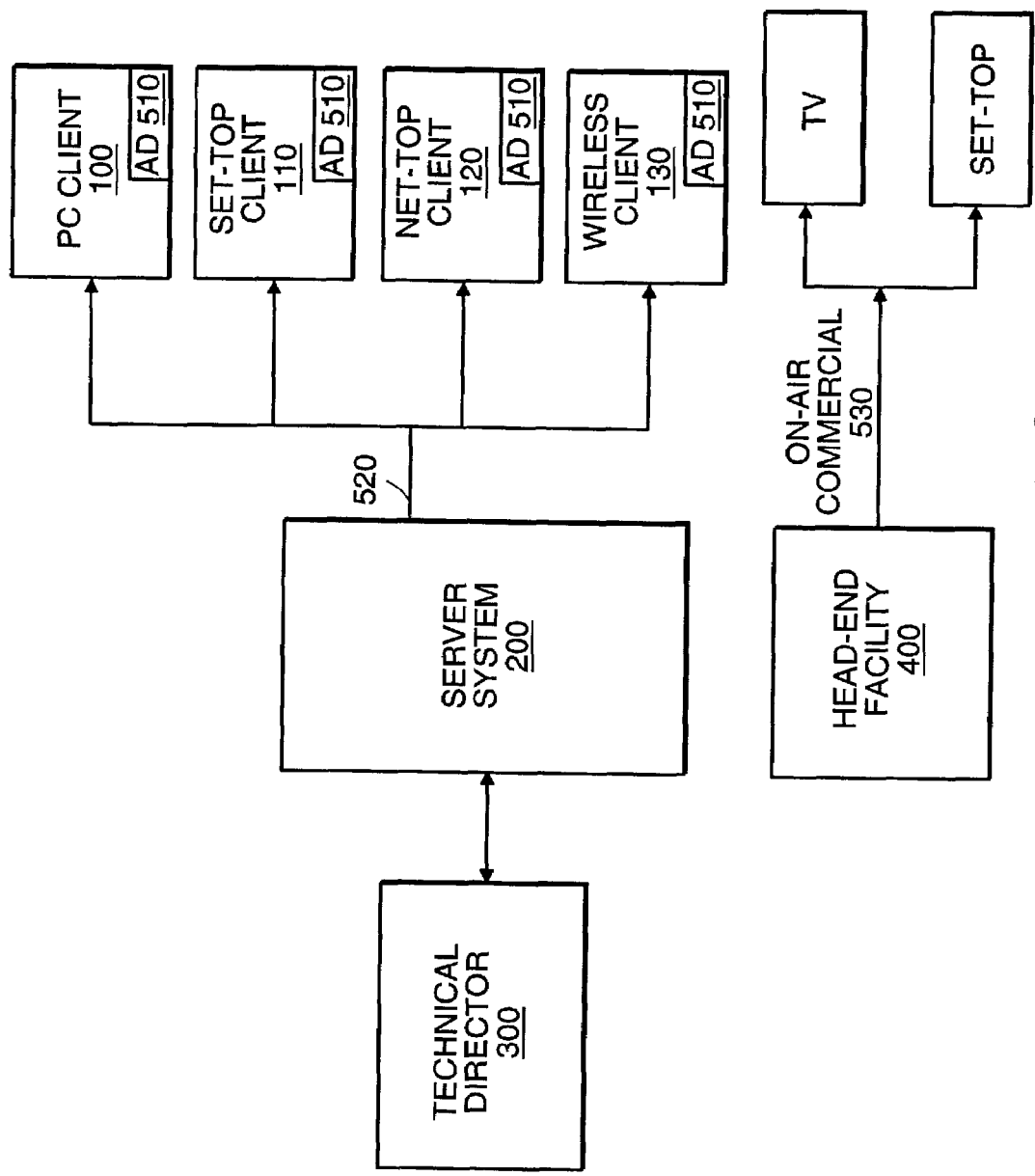
FIG. 6 is a block diagram representing the synchronization of targeted on-line advertising to the on-air broadcast over Internet Protocol across multiple client devices.

As shown in FIG. 6, the server system 200 can synchronize the display of targeted advertising on the client devices to on-air advertising. The server system 200 sends message type ad 520 over IP to the PC client 100, set-top client 110, net-top client 120, and wireless client 130. These clients will interpret this message type 520 to display Ad 510. The initiation of message type ad 520 can be synchronized to the broadcast such that the on-air commercial 530 will coincide with the display of Ad 510 on all the different client devices. Ad 510 can be personalized to the user of the client device based on profiling of the server system 200.

An example of targeting Ad 510 is a localized list of car dealers. A car commercial 530 for a brand or model airs on television; in response to that ad, and at the same time, a list of local dealers for that brand or model of car is presented to the users on the different client devices based on the zip code of the users. Other factors in the profile could be used, such as age. The concept of the Ad 510 will be similar for all the user devices: PC client 100, set-top client 110, net-top client 120 and wireless client 130. The list of dealers close by, however, will depend on the profile of the user.

Figure 7:
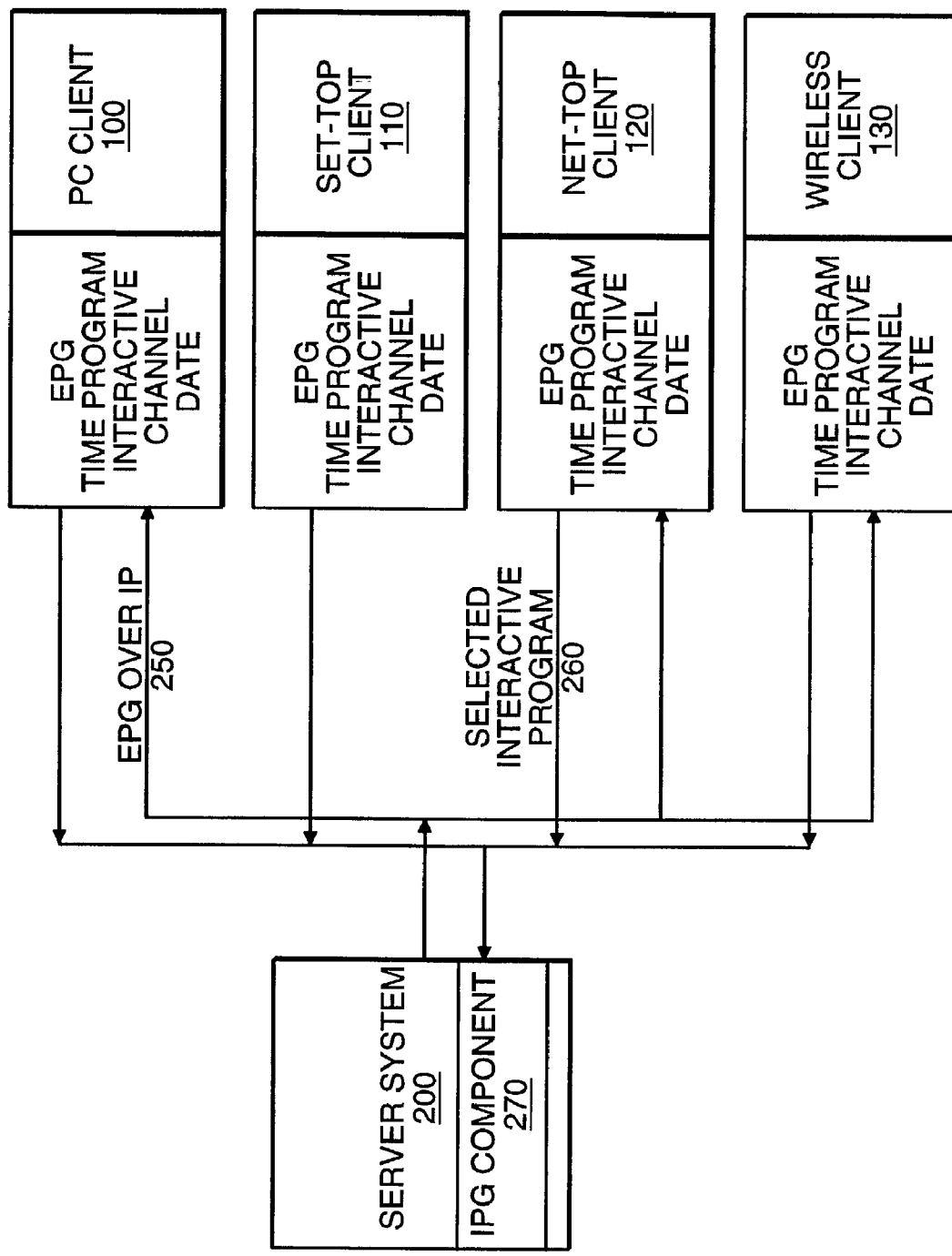
FIG. 7 is a flow diagram of the coordination of EPGs across multiple platforms and the association of interactivity to these EPGs.

In FIG. 7, another embodiment includes a system for interacting with electronic programming guides (EPGs). The server system 200 coordinates the presentation of EPGs over IP 250 across multiple user devices. The EPGs on the different devices have the interactive programming associated with the broadcast programming. Each user on one of the user devices 50 can select an interactive program 260 to interact with other users on the different user devices 50. The EPG implementation of the present invention includes the association of interactive programming with the EPG and the coordination of the EPG across multiple client devices 50 over IP by server system 200. The server system 200 uses the IPG component 270 to provide a mechanism for assigning users to the appropriate servers and services depending on their client device 50, chosen interactive programming and potentially their profile. In another embodiment the user can select interactive programming by clicking on an interactive identifier, using a remote control or using a keyboard. In all cases the IPG component 270 on the server side will assign the users to the appropriate servers and services.

Figure 8:
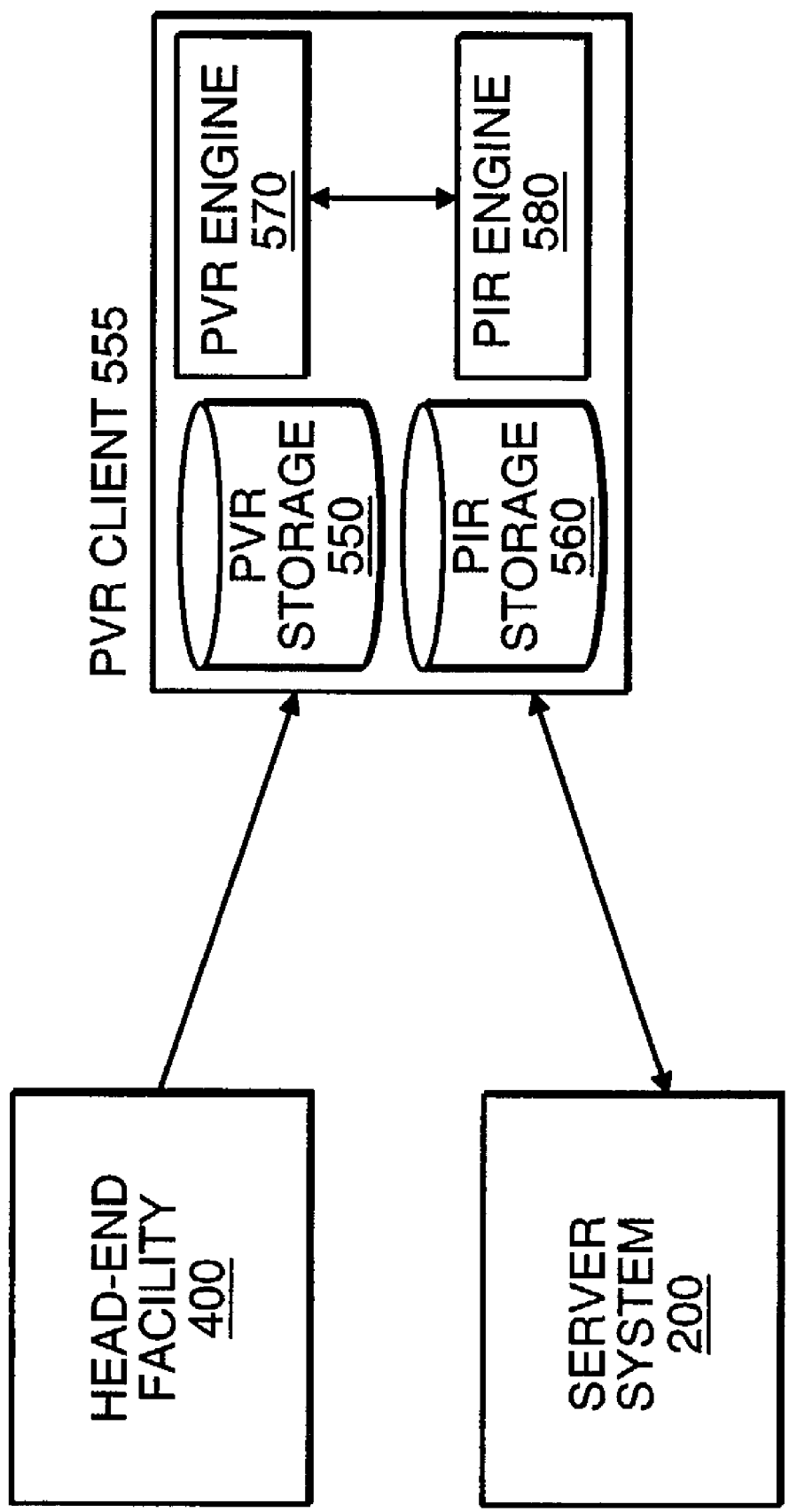
FIG. 8 is a block diagram of the solution for interactive programming and time-shifting devices.

FIG. 8 shows a solution for interactive programming associated with time-shifted on-air broadcast. A PVR is a local client 555 that can cache programming received from the head-end 400 in a PVR storage 550 (such as a resident hard drive). A PVR allows for record and playback, but also allows one to pause programming, such that the device records while earlier content is being displayed.

According to the present invention, as this recording occurs, a PIR (personal interactivity recorder) engine 580 stores interactive content in interactive storage 560 (which can be physically the same device as PVR storage 550) originating from server system 200. The PIR engine 580 subscribes to all video control messages to the PVR client 555, as well as the video frame markers. The PIR engine associates the interactive content (or links to other interactive content) to the video frame markers received by the PVR engine 570 and stores them on the interactive storage 560. The PIR engine then can perform all time modifying operations (fast forward, rewind, pause etc) of the PVR engine on the interactive content.

The PIR can have its own processing capability through a microprocessor or a dedicated processor or programmed logic, or it can use the processing capability of the PVR. The PIR can be programmed to know how to process the messages and content in advance, and further programming or modifications can be provided by downloading or flashing.

This system allows a user to respond to a poll and then get poll results (even if not affected by that user). The PIR records that a poll was sent at a particular time during the broadcast, or that a message was sent to display a previously downloaded or flashed poll. When the PVR plays back the broadcast program, the poll is displayed at the same time during the broadcast event as it would have been during the live broadcast, and can include any timeout mechanisms included in the content or governed by operating software. The user can then enter a response to the poll, and the server system can respond with poll results based on all results previously provided including the user with the PVR, or all results from when the program was live. By waiting for the user to enter a response the user is not influenced by seeing the poll results.

It may be desirable to disconnect the user from the server during playback, in which case, the PIR would record the display of the poll, any timer showing remaining time to enter a response, and the poll results at the time of the broadcast being recorded. In this way, the user has the experience he or she would have had, with the exception that his or her response may not be used in the poll results calculation.

In another example, in the case of a question-and-answer game, the system allows the user to continue to play along with the broadcast event in what appears to the user to be real time question and answer. The user can play under the same conditions, including if the trivia question has variable points depending on the speed of the response, get his or her own personal results, and get a leader board of the scores of other players as they were during the broadcast, but the user may not be able to play with others and be a part of the leader board because of the delay involved, especially if the trivia has scoring that varies with the speed of the response. However, because the interactive program information is recorded, the user can compare his or her score to those of other users who participated in real time.

The PIR can also store for playback chat messages displayed during the broadcast, fun facts, and any other one-way or interactive content provided from the server and with the broadcast.

Those skilled in the art would appreciate that there could be other ways to subscribe to the video control messages and markers, and that video frame markers can take many forms, including, but not limited to absolute and relative time code, and frame sequence numbers. In addition or in the alternative, the PIR can also store triggers or other content or address to obtain content and associate them with times during the broadcast program for display during playback.

An example of a hard drive device is a system made by TiVo, Inc., which is also assignee of U.S. Pat. No. 6,233,389, which is expressly incorporated by reference.

Figure 9:
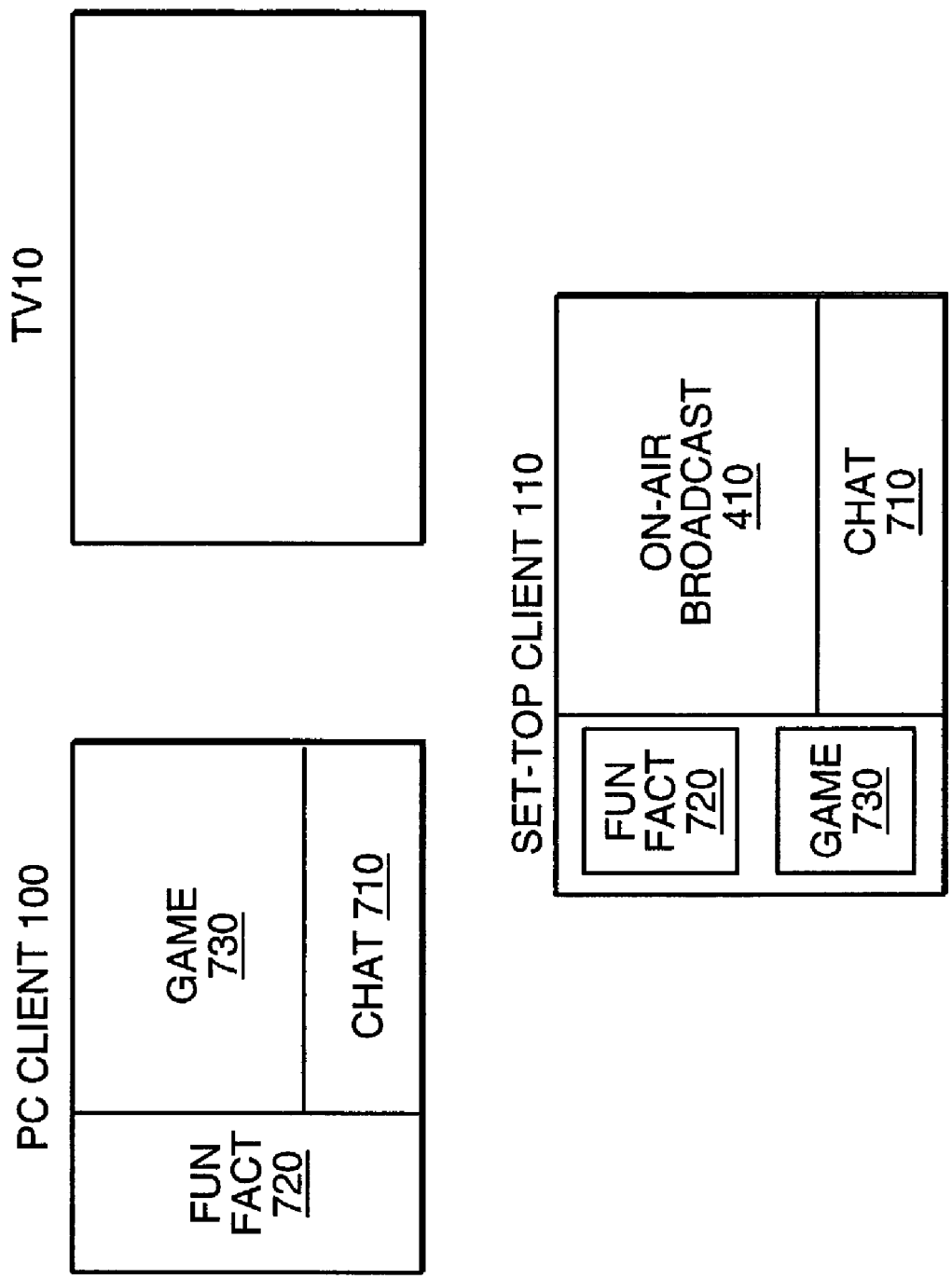
FIG. 9 shows the output of the content display interface on different user devices.

FIG. 9 illustrates the content display interface that determines the layout of interactive components based on the client hardware device. PC client 100 uses the full screen for interactive programming. Fun fact 720, game 730, and chat 710 are displayed across the full screen while TV 10 displays the on-air broadcast 410. In the case of the set-top client 110, the content display interface adjusts the placement of the interactive components based on the different type of client device. The on-air broadcast 410 takes up a large part of the screen real estate of set-top client 110 while fun fact 720, game 730, and chat 710 share the remaining space.

Having described embodiments of the present invention, it should be apparent that modifications could be made without departing from the scope of the invention as defined by the appended claims. In some instances, for example, the features are described in conjunction with television broadcast, but for some features, the broadcast event could be over internet (webcast) with or without television, through radio, or other broadcast medium that allows dissemination of information to a large number of remote recipients.

What is claimed is:

1. A method for enhancing a broadcast event for a plurality of remote viewers each having a client device including a local storage device and a personal interactivity recorder (PIR) for storing and playing back interactive content along with playback of the broadcast event, the method comprising:
    each local storage device receiving and storing the broadcast event in a first data store as the broadcast event is being broadcast via a broadcast event signal to the plurality of remote viewers during a first time period;
    each PIR coupled to the local storage device receiving one or more trigger messages from a server system separately from the broadcast of the broadcast event and not embedded in the broadcast event signal, the trigger messages identifying interactive content for display by the client devices during a first time period in response to the one or more trigger messages, the interactive content being related to the broadcast event;
    each PIR associating the trigger messages received from the server system to the broadcast event and storing the associated trigger messages in a second data store of the corresponding client device; and
    during playback of the stored broadcast event by a particular one of the client devices during a second time period, retrieving the stored broadcast event from the first data store and the stored trigger messages from the second data store for providing to the user the interactive content identified by the retrieved trigger messages at one or more times during the retrieved broadcast event when the interactive content would have been displayed when the broadcast event was being broadcast during the first time period, wherein the interactive content includes trivia questions, the PIR stores a correct answer, and responsive to an answer received from a user during playback, the PIR provides to the user an indication of a correct or incorrect answer.

2. The method of claim 1, wherein the local storage device includes fast forward, rewind, and pause functions.

3. The method of claim 1, wherein the associating includes associating information about the broadcast event to the trigger messages, the information being selected from a group consisting of absolute time codes, relative time codes, and frame sequence numbers.

4. The method of claim 1, wherein the first data store and the second data store reside in a same storage medium.

5. The method of claim 1, wherein the PIR uses the processing and storing functionality of the local storage device.

6. The method of claim 1, wherein the local storage device includes a hard drive.

7. The method of claim 1, wherein the PIR stores messages sent by other viewers using a chat functionality during the broadcast event and received over a separate channel from the broadcast and therefore not embedded in the broadcast signal, the messages being displayed during play back at the time during the broadcast event when the messages were displayed.

8. The method of claim 1, wherein the PIR includes processing and storage separate from the local storage device.

9. The method of claim 1, wherein the interactive content provided during the first and second time periods is not targeted interactive content that is based on individualized viewer profile information.

10. The method of claim 1, wherein the PIR is invoked for forwarding and rewinding the stored interactive content.

11. The method of claim 1 further comprising:
    receiving a user interaction from the particular one of the devices during playback of the interactive content, wherein the interactive content is a poll question and the user interaction is a response to the poll question, wherein the poll response transmitted during the playback of the interactive content is ignored by the server system in calculating a poll result.

12. The method of claim 1, wherein the broadcast event is broadcast of a video program that contains no embedded triggers associated with the interactive content.

13. The method of claim 12, wherein the interactive content is transmitted by the server system over a wide area network concurrently with the video program, wherein the interactive content is synchronized with the video program.

14. The system of claim 1, wherein the stored trigger messages include information associating the interactive content to the broadcast event.

15. The system of claim 14, wherein the information is a video frame marker.

16. A method for enhancing a broadcast event for a plurality of remote viewers each having a client device including a local storage device and a personal interactivity recorder (PIR) for storing and playing back interactive content along with playback of the broadcast event, the method comprising:
    each local storage device receiving and storing the broadcast event in a first data store as the broadcast event is being broadcast via a broadcast event signal to the plurality of remote viewers during a first time period;
    each PIR coupled to the local storage device receiving one or more trigger messages from a server system separately from the broadcast of the broadcast event and not embedded in the broadcast event signal, the trigger messages identifying interactive content for display by the client devices during a first time period in response to the one or more trigger messages, the interactive content being related to the broadcast event;

each PIR associating the trigger messages received from the server system to the broadcast event and storing the associated trigger messages in a second data store of the corresponding client device; and during playback of the stored broadcast event by a particular one of the client devices during a second time period, retrieving the stored broadcast event from the first data store and the stored trigger messages from the second data store for providing to the user the interactive content identified by the retrieved trigger messages at one or more times during the retrieved broadcast event when the interactive content would have been displayed when the broadcast event was being broadcast during the first time period, wherein the interactive content includes poll questions, the PIR stores poll results, and responsive to a response to one of the poll questions received from a user, the PIR provides the poll results after receiving the response to the poll question from the user.

17. A system for use with a local storage device at a remote viewer location for storing and playing back interactive content along with playback of a broadcast event, the system including:

a data store;

a personal interactivity recorder (PIR) at the remote viewer location, the PIR being configured to receive one or more trigger messages from a server separately from a broadcast of a broadcast event and not embedded in a broadcast signal broadcasting the broadcast event, the trigger messages identifying interactive content for display by the client devices during a first time period in response to the one or more trigger messages, the interactive content being related to the broadcast event, the PIR associating the received trigger messages to the broadcast event and storing the associated trigger message in the data store, wherein when the broadcast event is played back from storage, the PIR retrieves the stored trigger messages from the data store and provides the interactive content identified by the retrieved trigger messages during times within the stored broadcast event when the interactive content would have been displayed when the broadcast event was broadcast, and wherein the interactive content includes poll questions, the PIR is configured to store poll results, and responsive to a response to one of the poll questions received from a user, the PIR is configured to provide the poll results after receiving the response to the poll question from the user.

18. The system of claim 17, wherein the local storage device includes fast forward, rewind, and pause functions.

19. The system of claim 17, wherein the associating includes associating information about the broadcast event to the trigger messages, the information being selected from a group consisting of absolute time codes, relative time codes, and frame sequence numbers.

20. The system of claim 17, wherein the interactive content includes trivia questions, and the PIR stores the questions and answers provided during the broadcast.

21. The system of claim 20, wherein the PIR provides to the user an indication of a correct or incorrect answer after the user enters an answer to the trivia question.

22. The system of claim 17, wherein the data store storing the interactive content resides in a same storage medium as a data store storing the broadcast event.

23. The system of claim 17, wherein the interactive content provided by the PIR and at the broadcast time of the broadcast event is not targeted interactive content that is based on individualized viewer profile information.

24. An interactive television system for storing and playing back an enhanced video program, the system including:

a broadcast device for broadcasting a video program during a first time period, the video program being associated with interactive data for displaying interactive content during the first time period; and a plurality of client devices at a plurality of end-user locations, each of the plurality of client devices coupled to the broadcast device over a data communications network and receiving the broadcast video program via a broadcast signal, the plurality of client devices further receiving one or more trigger messages from the server separately from the broadcast video program, the trigger messages identifying interactive content for display by the client devices during a first time period in response to the one or more trigger messages, each client device including a first recording device coupled to a first local storage medium for recording the broadcast video program and a second recording device coupled to a second local storage medium for recording the trigger messages, the first and second recording devices being respectively configured to retrieve the recorded video program from the first local storage medium and the stored trigger messages from the second local storage medium during a second time period in response to a user command, and play back the retrieved video program and the interactive content identified by the retrieved trigger messages, wherein the playback of the interactive content is at one or more times during the retrieved video program when the interactive content would have been displayed when the video program was broadcast during the first time period, and wherein the PIR is configured to store a correct answer, and responsive to an answer received from a user during playback, the PIR is configured to provide to the user an indication of a correct or incorrect answer.

25. The system of claim 24, wherein the first local storage medium is the same as the second local storage medium.

26. The system of claim 24, wherein the first recording device is the same as the second recording device.

27. The system of claim 24 further comprising:

a user input device coupled to each client device for transmitting a video control message to the first and second recording devices, the first and second recording devices being configured to separately perform a corresponding action on respectively the video program and interactive content in response to the video control message.

28. The system of claim 27, wherein the video control message is a message selected from a group consisting of fast forwarding, rewinding, and pausing.

29. The system of claim 24, wherein the interactive content provided during the first and second time periods is not targeted interactive content that is based on individualized viewer profile information.

30. The system of claim 24, wherein the first recording device recording the video program is a personal video recorder (PVR) engine and the second recording device recording the interactive data is a personal interactivity recorder (PIR) engine separate from the PVR engine for recording the trigger messages separately from the video program.

31. A system for use with a local storage device at a remote viewer location for storing and playing back interactive content along with playback of a broadcast event, the system including:

a data store;

a personal interactivity recorder (PIR) at the remote viewer location, the PIR being configured to receive one or more trigger messages from a server separately from a broadcast of a broadcast event and not embedded in a broadcast signal broadcasting the broadcast event, the trigger messages identifying interactive content for display by the client devices during a first time period in response to the one or more trigger messages, the interactive content being related to the broadcast event, the PIR associating the received trigger messages to the broadcast event and storing the associated trigger message in the data store, wherein when the broadcast event is played back from storage, the PIR retrieves the stored trigger messages from the data store and provides the interactive content identified by the retrieved trigger messages during times within the stored broadcast event when the interactive content would have been displayed when the broadcast event was broadcast, and wherein the interactive content includes trivia questions, the PIR is configured to store a correct answer, and responsive to an answer received from a user during playback, the PIR is configured to provide to the user an indication of a correct or incorrect answer.

32. An interactive television system for storing and playing back an enhanced video program, the system including:

a broadcast device for broadcasting a video program during a first time period, the video program being associated with interactive data for displaying interactive content during the first time period; and a plurality of client devices at a plurality of end-user locations, each of the plurality of client devices coupled to the broadcast device over a data communications network and receiving the broadcast video program via a broadcast signal, the plurality of client devices further receiving one or more trigger messages from the server separately from the broadcast video program, the trigger messages identifying interactive content for display by the client devices during a first time period in response to the one or more trigger messages, each client device including a first recording device coupled to a first local storage medium for recording the broadcast video program and a second recording device coupled to a second local storage medium for recording the trigger messages, the first and second recording devices being respectively configured to retrieve the recorded video program from the first local storage medium and the stored trigger messages from the second local storage medium during a second time period in response to a user command, and play back the retrieved video program and the interactive content identified by the retrieved trigger messages, wherein the playback of the interactive content is at one or more times during the retrieved video program when the interactive content would have been displayed when the video program was broadcast during the first time period, and wherein the interactive content includes poll questions, the PIR is configured to store poll results, and responsive to a response to one of the poll questions received from a user, the PIR is configured to provide the poll results after receiving the response to the poll question from the user.

* * * * *